United States Patent
Majahan (10) Patent No.: US 7,593,744 B2
(45) Date of Patent: Sep. 22, 2009

(54) METHOD FOR IMPLEMENTING GAMES IN A COMMUNICATION NETWORK USING PTT/PTV TECHNOLOGY AND SYSTEMS THEREOF

(75) Inventor: Sunil Majahan, Gurgaon (IN)

(73) Assignee: Aricent Inc., George Town (KY)

( * ) Notice: Subject to any disclaimer, the term of this patent is extended or adjusted under 35 U.S.C. 154(b) by 696 days.

(21) Appl. No.: 11/427,168

(22) Filed: Jun. 28, 2006

(65) Prior Publication Data

US 2007/0004517 A1   Jan. 4, 2007

(30) Foreign Application Priority Data

Jun. 30, 2005   (IN) .................. 1259/DEL/2005

(51) Int. Cl.
*H04B 7/00* (2006.01)
(52) U.S. Cl. .................. 455/519; 455/518; 455/517; 455/516; 455/507; 455/509; 455/450; 455/452.1; 455/452.2; 455/3.05; 455/3.06; 348/14.01; 348/14.02; 348/14.08; 348/E7.078; 348/E7.083
(58) Field of Classification Search .................. 455/3.05, 455/3.06, 450, 451, 452.1–452.2, 41.2, 500, 455/502, 503, 507–519, 550.1, 90.1–90.2; 348/14.01–14.16, E7.078, E7.079, E7.081, 348/E7.082, E7.083
See application file for complete search history.

(56) References Cited

U.S. PATENT DOCUMENTS

| | | | |
|---|---|---|---|
| 6,701,344 B1 | 3/2004 | Holt et al. | |
| 6,811,486 B1 | 11/2004 | Luciano, Jr. | |
| 6,865,398 B2 * | 3/2005 | Mangal et al. | ........... 455/552.1 |
| 6,875,110 B1 | 4/2005 | Crumby | |
| 6,882,978 B2 | 4/2005 | Ebisawa | |
| 6,884,162 B2 | 4/2005 | Raverdy et al. | |
| 6,916,247 B2 | 7/2005 | Gatto et al. | |
| 7,043,266 B2 * | 5/2006 | Chaturvedi et al. | ......... 455/519 |
| 7,283,489 B2 * | 10/2007 | Palaez et al. | ................. 370/277 |
| 7,353,036 B2 * | 4/2008 | Lemke et al. | ................ 455/509 |
| 7,446,795 B2 * | 11/2008 | Rengaraju et al. | ........ 348/14.01 |
| 7,499,719 B2 * | 3/2009 | Rengaraju et al. | ............ 455/518 |
| 2004/0224710 A1 | 11/2004 | Koskelainen et al. | |
| 2006/0082641 A1 * | 4/2006 | Rengaraju et al. | ........ 348/14.02 |

* cited by examiner

*Primary Examiner*—Tuan A Tran
(74) *Attorney, Agent, or Firm*—Workman Nydegger (57) ABSTRACT

A push-to-talk/push-to-video based communication system configured to implement a plurality of games, including group games and methods thereof. A game controller in communication over an access network with a push-to-talk/push-to-video server, and plurality of push-to-talk/push-to-video clients implements group games in the PTT/PTV based communication network. Game controller has a first game control apparatus, a game authentication means, a billing apparatus, a second game control apparatus, and a local storage apparatus. A group management server enables receiving and storing of user information and a presence server maintains presence information.

34 Claims, 9 Drawing Sheets

Creating Gaming

Typical Game Flow

METHOD FOR IMPLEMENTING GAMES IN A COMMUNICATION NETWORK USING PTT/PTV TECHNOLOGY AND SYSTEMS THEREOF

BACKGROUND OF THE INVENTION

1. Field of the Invention

This invention, in general, relates to the field of Push to Talk (PTT) and/or Push to Video (PTV) technologies. More particularly, the present invention provides a method for implementing games in a communication network employing PTT/PTV technology and related systems.

2. Description of the Related Art

Communications service providers offer a variety of value added services to customers. Provision to play games using communication infrastructure, either involving two user-terminals or among multiple user-terminals (known as group gaming) is one such value added service. Group gaming requires the players to be connected either through the Internet or through a communication network. The basic requirement of a gaming infrastructure is one or more user-terminals in communication with a game controller through a communication network.

The use of wireline and wireless communication networks for implementing group games is known in prior art. But, the prior art group gaming implementations do not teach implementing group gaming in Push to Talk (PTV)/Push to Video Technologies in the manner in which the present invention provides for such implementation.

Push To Talk (PTT) service is a two-way form of communications that allows users to initiate communication with one or more users. This communication could be initiated with single user or with group of users. The group can be pre-defined group created by users or service provider or can be created in realtime by the user of the service. PTT service is motivated by "walkie-talkie" service where a user can press a button to talk with single user or to a group of users. Other users can also respond to this message once the initial speech is complete. The communication in PTT is half-duplex, which means, at most one user can talk at a time and all other users hear the speech. This contrasts with voice calls, which are full duplex, where more than one person can talk at same time.

Push to Video (PTV) is similar to PTT, with this service, instead of voice only communication it involves both voice and video.

PTT has been deployed in wireless networks across the world primarily as replacement of walkie-talkie service, which was primarily targeted for group communication across people involved in field jobs or law enforcement agencies. However this service has gained popularity across other sections of societies and people are using PTT for group-based communication with enterprises, as chat service, among young population as group communication media etc. Most of the current deployments of this service is in wireless networks and is based on circuit switched networks. However standards are emerging where PTT and PTV are being standardized by standard bodies and are now based on more economical data networks. OMA (Open Mobile Alliance (www.openmobilealliance.org) is actively involved in standardization of PTT service using SIP (Session Initiation Protocol).

3. Prior Art

U.S. Pat. No. 6,701,344 to Holt, et al. discloses a computer network for providing a game environment for the participants wherein the network is a peer-peer (P2P) network implementing a broadcast technique using a m regular, m connected graph for broadcasting the message, employing point- to- point connections between host computers. This enables the various processes (i.e. the participants) in the computers point-to-point connections with the other participants. It is more specifically related to providing a reliable and scalable communication system, in particular for gaming, using Internet as the underlying network and Internet protocols (TCP/IP).

U.S. Pat. No. 6,811,486, to Luciano, Jr. discloses a gaming system enabling the game state manager implemented in software to read and save enhanced game play states i.e. some state found beyond the base game state using the saved and transferred game state information encrypted in the voucher. This thereby enables the players to be involved in longer-term and related game plays spanning more than one game session and more than one game.

U.S. Pat. No. 6,875,110 to Crumby et al. discloses a communication device for multiplexing communications between a master game controller on a gaming machine and game service servers. This provides architecture for reducing the complexity and cost of the gaming network environment associated with addition of new gaming services to a gaming machine. The communication multiplexer device uses network communication protocol like TCP/IP for transmission over wired or wireless network interface.

U.S. Pat. No. 6,884,162 to Raverdy, et al. discloses to an improvement in information management techniques system and method to support electronic gaming. For instance, it discusses a system configured to perform a trading transaction i.e. a transfer procedure for transferring ownership rights of an electronic certificate related to the electronic gaming.

U.S. Pat. No. 6,916,247 to Gatto, et al. discloses in general to addressing the problems related to secured identification and secured network communication. It discusses an architecture employing the software i.e. associated API or S-ASI . . . and protocols used for ensuring security and authenticity of pay entertainment and gaming systems.

U.S. Pat. No. 6,882,978 to Ebisawa et al. relates to executing a game program having advertisements therein and, more particularly, to apparatus and method for executing a game program in which advertisements displayed are updated by downloading new advertisement data prior to the execution.

The abovementioned prior arts provide different techniques and method for the gaming system, however none of the prior art uses a PTT/PTV infrastructure for the gaming system which provides for nearly instant—connect, enabling quick burst oriented communication between end users providing greater range, reliability and improved privacy.

U.S. patent application Ser. No. 20040224710 relates to introducing services into a Push To Talk (PTT) environment by using PTT infrastructure as message routing infrastructure for service request and service response, wherein one of the PTT client acts as application server to respond to the service requests received from PTT clients. It does not use basic PTT capability of media communication among group members and floor control for media to introduce new services.

SUMMARY OF THE INVENTION

It is a principal aspect of the present invention to devise a system for implementing games in a communication network employing push-to-talk/push-to-video technology.

It is another important aspect of the present invention to devise a method for implementing games in a communication system employing push-to-talk/push-to-video technologies.

In one preferred embodiment, disclosed herein is a system for implementing games in communication network employing push-to-talk/push-to-video technology. The communication system comprises a game controller in communication with a push-to-talk/push-to-video server and any or all of said plurality of push-to-talk/push-to-video clients. The game controller has a first game control means that interfaces with push-to-talk/push-to-video clients to manage a game in session. A game logic in the game controller manages the game session. Game controller further comprises a game authentication means capable of authenticating game participation request from any of the push-to-talk/push-to-video clients, a game billing means capable of generating billing records of any of said push-to-talk/push-to-video clients participating in a game, a second game control means enabling an end user by generating game configuration, game controls, game schedules and game groups; and a local storage means for storing game and participation information. The game controller controls the flow of a game by controlling bearer floor along with push-to-talk/push-to-video clients. Game controller and game client can also use other means to control flow of the game. The system is configured to implement games in a push-to-talk/push-to-video based communication network.

In another preferred embodiment, the system for implementing games in a communication network employing push-to-talk/push-to-video technology disclosed herein has a game controller that hosts any one of said plurality of push-to-talk/push-to-video clients.

In yet another preferred embodiment, disclosed herein is a system for implementing games in a communication network employing push-to-talk/push-to-video technology having a game controller configured to control access to media floor. The system enables any of the multiple push-to-talk/push-to-video clients to participate in a scheduled gaming session or an ongoing gaming session.

In still another preferred embodiment, the invention is directed at a system for implementing games in a communication network employing push-to-talk/push-to-video technology having a game controller that has a first game control means configurable to permit registration by any or all of said plurality of push-to-talk/push-to-video clients for a group game, a first game control means configurable to interface with any or all of said push-to-talk/push-to-video clients to manage a game in session employing a game logic, a game authentication means, capable of authenticating game participation request from any of said plurality of push-to-talk/push-to-video clients, a game billing means capable of generating billing records of any of said push-to-talk/push-to-video clients participating in a game, a second game control means enabling an end user by generating game configuration, game controls, game schedules and game groups; and a local storage means for storing game and participation information.

In one another preferred embodiment, the invention is directed at a game controller capable of controlling the flow of a game by controlling bearer floor and it is further capable of alternating between any one of said plurality of push-to-talk/push-to-video clients participating in a group game.

In still an embodiment, the system for implementing group games in push-to-talk/push-to-video communication architecture is capable of displaying game related information to a plurality of push-to-talk/push-to-video clients participating in a group game and also broadcasting advertisement clippings/information in between the floor occupying and floor releasing sequences.

In one another preferred embodiment, the system for implementing group games in push-to-talk/push-to-video communication architecture is capable of being implemented in a wireless or a wireline communication system.

In another embodiment, the game controller is capable of holding the media floor for any duration of time and using floor control to announce game results. Further, the game controller is capable of removing players from the game. The system further has a first game control means configured to receive user information from any or all of said plurality of push-to-talk/push-to-video clients initiating to participate in a game and transfers said user information to said local storage means for temporary storing.

In yet another embodiment, the invention disclosed herein has a group management server configured to receive and store user information received from said local storage means. The group management server enables access to said user information by said game controller.

In still another embodiment, the system for implementing group games in push-to-talk/push-to-video communication architecture disclosed herein has a presence server configured to maintain presence information of any or all of said plurality of push-to-talk/push-to-video clients participating in a game. The presence server enables access to said presence information by said game controller and/or any or all of said plurality of push-to-talk/push-to-video clients participating in a game.

It is an aspect of the present invention to devise a method of implementing games in a communication network using push-to-talk/push-to-video technology. The method comprises configuring a push-to-talk/push-to-video server in communication with a plurality of push-to-talk/push-to-video clients over an access network. The method further comprises configuring a game controller having a first game control means a game authentication means, a billing means, a second game control means, and a local storage means, the game controller in communication with the plurality of push-to-talk/push-to-video clients, managing a game session employing a game logic by said first game control means, said first game control means interfacing with any or all of said push-to-talk/push-to-video clients, authenticating game participation of any of said plurality of push-to-talk/push-to-video clients by said game authentication means, generating billing records of any of said push-to-talk/push-to-video clients participating in a game by said billing means, enabling an end user to generate game controls by said second game control means, storing game and participation information by said local storage means, and implementing a game involving any or all of said plurality of push-to-talk/push-to-video clients in communication with said push-to-talk/push-to video server over said access network wherein the flow of a game is controlled by said game controller by exercising control over bearer floor or other means implemented by game controller and game clients.

In another aspect, the method of this invention comprises controlling access to media floor by said game controller, concurrently hosting multiple games by said game controller and displaying game related information to the plurality of push-to-talk/push-to-video clients participating in a group game by said game controller.

In still another aspect, the method disclosed herein can be implemented in a wireless or a wireline communication system. It further involves holding the media floor for any duration of time or revoking media floor from any push-to-talk/push-to-video clients from the game by said game controller and optionally inserting advertising material in between the floor occupying and floor releasing sequences by said game controller.

It is also an aspect of the present invention to devise a method of announcing game results by said game controller of using said floor control. The method further comprises receiving user information from any or all of the plurality of push-to-talk/push-to-video clients and transferring said user information to said local storage means for temporary storing by said first game control means.

In another aspect, the invention discloses a method of receiving and storing user information from said local storage means by a group management server and maintaining presence information of any or all of the plurality of push-to-talk/push-to-video clients participating in a game by a presence server.

In yet another aspect the present invention discloses implementing a plurality of games including the tambola game, in a push-to-talk/push-to-video communication architecture.

BRIEF DESCRIPTION OF THE DRAWING FIGURES

Further aspect of the present invention together with additional features contributing thereto and advantages accruing there from will be apparent from the description of preferred embodiments of the present invention which are shown in the accompanying drawing figures.

DETAILED DESCRIPTION OF THE INVENTION

The present invention is concerned with creating a gaming infrastructure, which is used to build gaming applications or group games on Push-to-Talk (PTT), also called PoC (PTT on cellular networks), or Push-to-Video technology (PTV), wherein said gaming infrastructure consists of PTT/PTV infrastructure, PTT/PTV clients and game controller application (which is also a PTT/PTV client).

Further according to the present invention, there is provided a method for creating an infrastructure that allows users or players to register with the gaming application and then play the games with group of users who all are registered for the same game, wherein the user can use a fixed or mobile devices and wherein the gaming application and all the users are PTT or PTV clients communicating to each other using PTT/PTV infrastructure.

Figure 1:
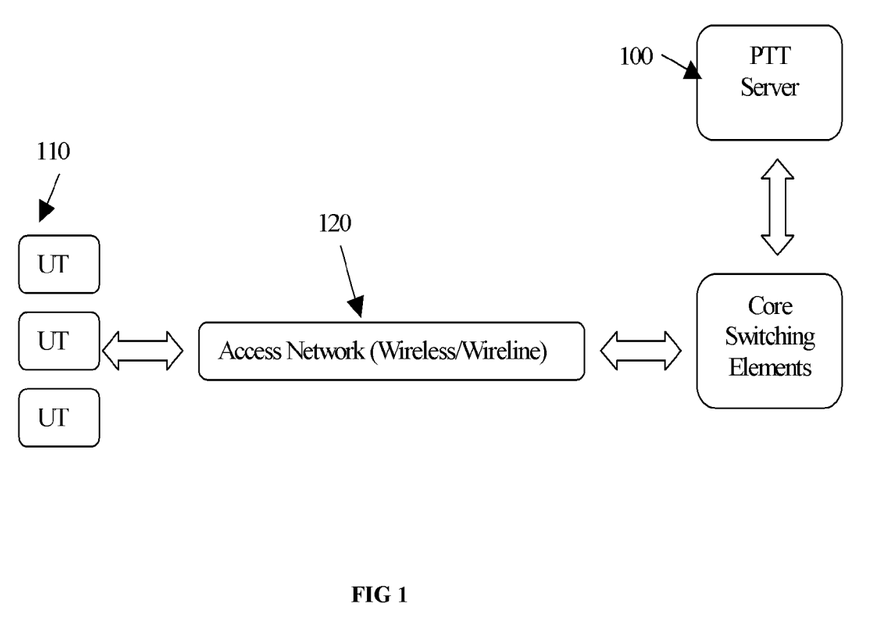
FIG. 1 illustrates the PTT/PTV infrastructure.

As illustrated in FIG. 1, this infrastructure can be built on wireless or fixed network and can be deployed with either pure wireless; pure fixed network or a converged fixed and mobile network (FMC). The PTT access network (120) can be any access network connected between PTT client (110) and PTT server (100). Though PTT service can be realized on either circuit or packet technology based access networks, but current recommendations support packet based technologies for its economy and scalability. PTT access network (120) provides means for PTT client (110) to register for communication, also provides routing support for connection and call routing. Further PTT access network (120) also provides support to PTT client (110) to locate PTT server (100).

The user terminal (UT) is the PTT client device (110), which is capable of normal voice/data communication on connected access network (120) and is also loaded with PTT client software. PTT client (110) is responsible for initiating and terminating PTT sessions. PTT client (110) can either initiate one-to-one PTT session or one-to-many PTT session. PTT client (110) also realizes a user interface for user to initiate and terminate PTT sessions and also provide control buttons for user to take or release media floor.

The PTT server (100) is the central entity in the network, which controls the access to PTT service when the clients register with the PTT service. The PTT server (100) controls media floor (allocation or de-allocation of media floor) for each PTT group or one to one communication. PTT server (100) is responsible for determination of group addresses for each communication and is also responsible for termination of PTT session. PTT server (100) is also responsible for quality of service for media.

Figure 2A:
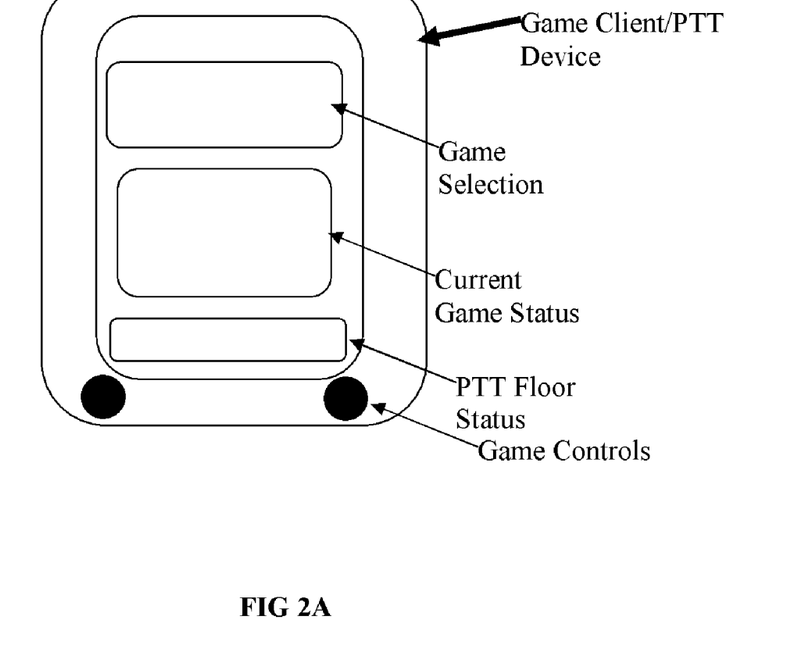
FIG. 2A illustrates the user interface at user terminal (UT)
Figure 2B:
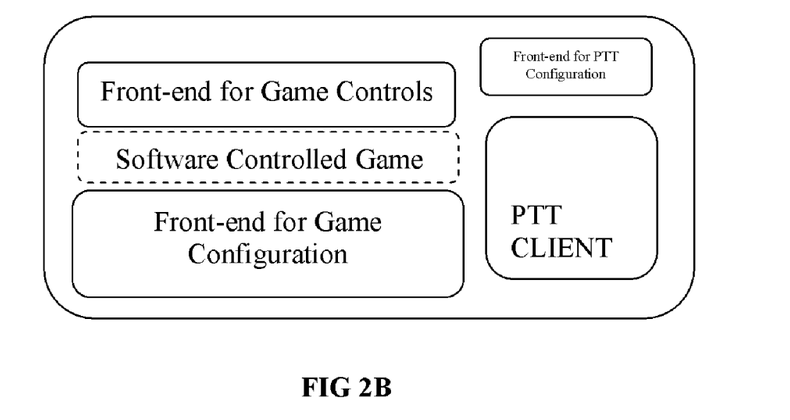
FIG. 2B illustrates a user terminal software interface.

FIG. 2A illustrates a typical user interface at user terminal (UT) (110) in accordance with the present invention and FIG. 2B illustrates a user terminal software which consists of PTT client and gaming software with front end to support PTT and game configuration and support for game control. The said gaming software and front-end will be different for each game supported by user terminal (110), however PTT client (110) can be reused across all games.

Figure 3:
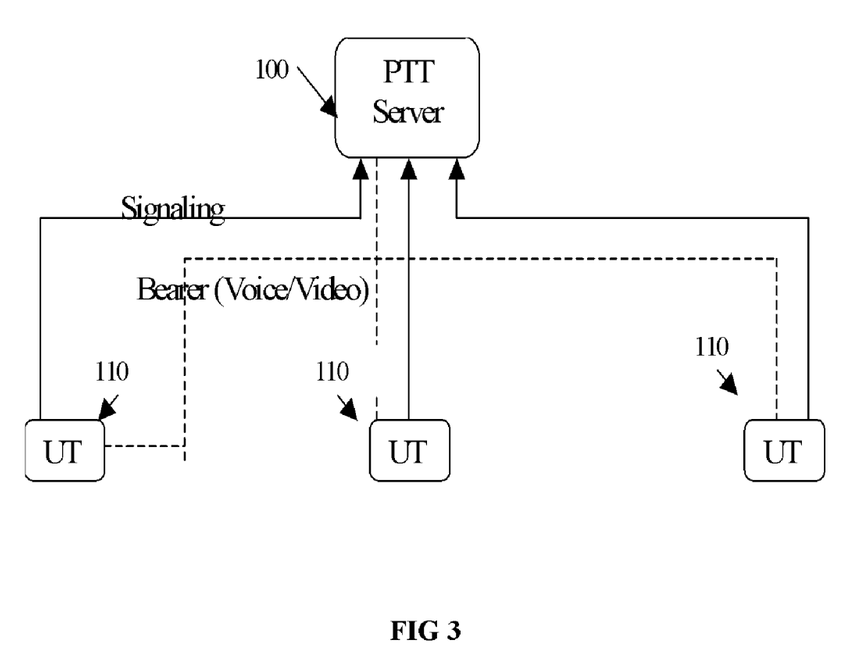
FIG. 3 illustrates the PTT/PTV communication in a group.

FIG. 3 illustrates the PTT/PTV communication in a group As shown in FIG. 3, PTT or PTV allows two or more users to create a session wherein each user can take the bearer (voice or video or text) floor to send its contents (voice, video or text). It can be used for group communication wherein at any point in time only one user can send communication and it is delivered to all the users in the group. The PTT service thereby requires media floor to be accessible to only one client in a session for sending media or contents and all other clients for receiving media. The PTT service as defined by OMA has a media (or floor) control protocol, which is realized by both PTT server (100) and PTT client (110) wherein the PTT service is implemented in the following way:

The PTT client initiates the session and is given the media floor for media transmit (or sending media), in a group communication session, all other clients are given read or receive access to media. The controller of the floor thereby sends media and all other clients receive media.

Media from any client (i.e. the controller at that point in time) always goes through PTT server and PTT server forwards it to all other clients in the group, the PTT server allocates floor to the client, which is next in the request queue, when floor controller releases the floor wherein any client can request for floor at any point in time., if floor is idle, PTT server allocates the floor to the requesting client, else its request is queued for subsequent allocation, if session termination request comes to the PTT server, it releases the complete session.

Figure 4A:
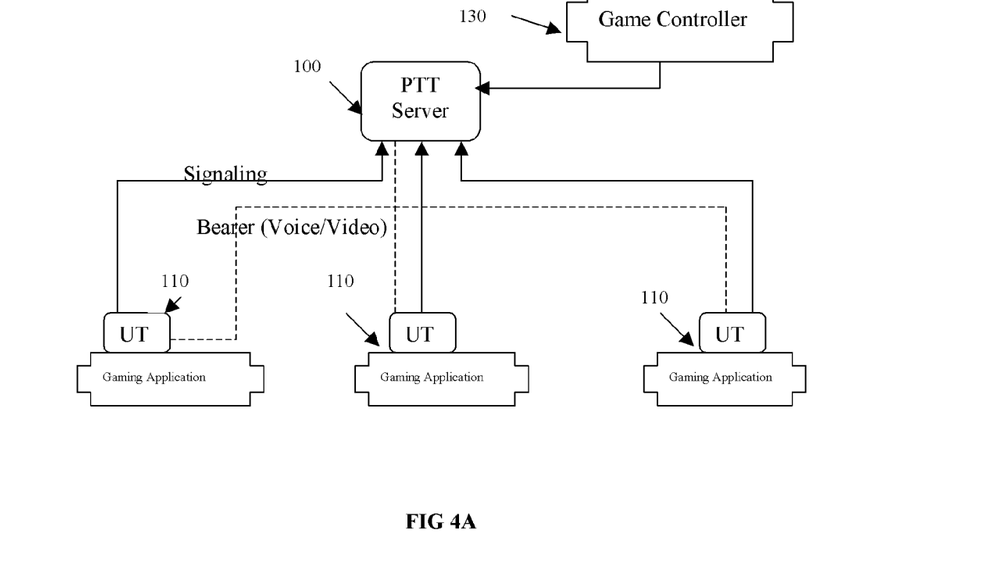
FIG. 4A illustrates the gaming on PTT/PTV wherein the game controller is not on the same access network.

As shown in FIG. 4A, the said infrastructure can support gaming applications, which require a game controller (130), and one or more players in the game. Game controller (130)

is the gaming application, which can either be controlled manually by human operator or can be automated by software or hardware controls. Group activities, which requires controlled access to the media floor is being referred to as group games, these could be activities like quizzing, controlled voting etc.

Figure 4B:
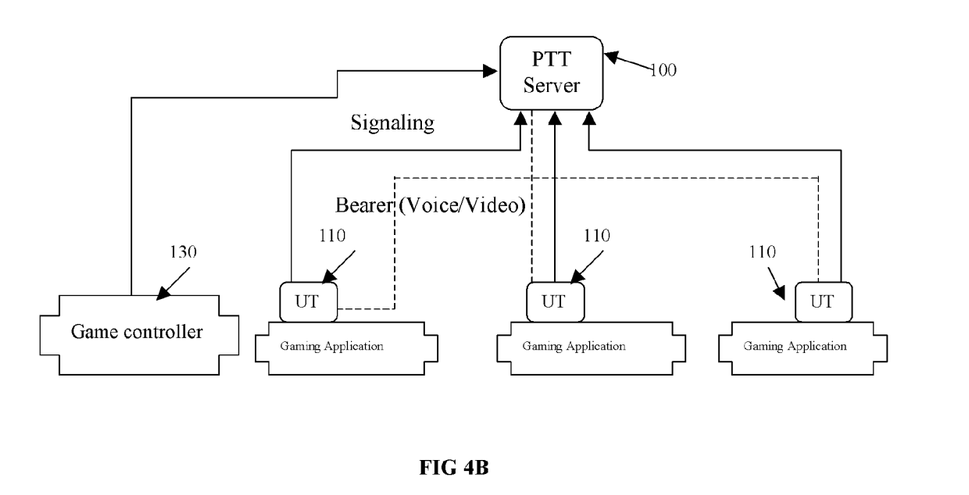
FIG. 4B illustrates the gaming on PTT/PTV wherein the game controller is on the same access network.

Referring to FIG. 4B, said infrastructure is used to create a group gaming or group activities wherein one of the user becomes group controller (130) or game controller (130), which helps other users to play the game or controls other users during the game. The game controller (130) functionality is same, irrespective of its physical location in the network whether it is on the same access network or different access network. Said infrastructure can also be extended to support games wherein the controller of the game alternate between various players. In this case each player can become game controller for a short period of time. It is to be understood that with one PTT session there is only one media floor and can be accessed by only one client or by game controller. However if game controller and/or client are in multiple game sessions (implies multiple PTT sessions), this implies that there are multiple PTT sessions created, one each for each game session. The client or game controller can access floor of each such session independently.

Figure 4C:
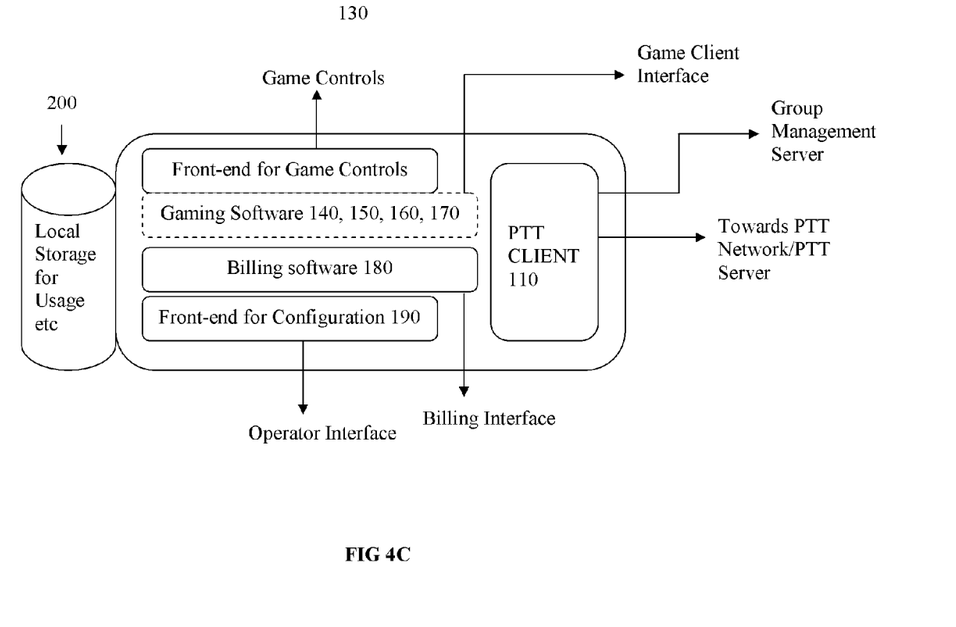
FIG. 4C illustrates the software architecture of the game controller in accordance with the present invention.

Referring to FIG. 4C, the game controller (130) hosts a PTT/PTV client (110), which is capable of supporting multiple PTT/PTV sessions wherein the PTT/PTV Client is a standard PTT client and is embedded into the Game Controller software. The Game Controller (130) has a first game control means (140) implemented as a gaming software to interface user terminals (UT) or the game clients (110). This interface with said game client (110) is for interaction with game participants and also to run the game logic (150) to move game from one step to other. The said first game control means (140) is capable of authenticating the participant request (170). Further the game controller (130) can have multiple gaming software if it supports multiple games wherein the said gaming software drives the game logic (150). The game controller (130) comprises a second game control means (190) implemented as a front-end software to provide the operator controls to configure the game controller (130) wherein the operator runs the game manually or it can have software controlled games wherein there is no human intervention required enabling the user to create game configuration, controls to customize game, schedule games etc. This software also provides interfaces to create game groups.

The game controller (130) has a local storage means (200) operable to log or store all the game details i.e. the game and participation information. The said means (200) is used by the game controller (130) to store group information of all the participants, game results, game software, game schedules etc.

The game controller (130) further comprises a game billing means (180) capable to generate billing records of the plurality of push-to-talk/push-to-video clients (110) participating in the game.

The game controller (130) optionally interfaces towards group management server or Presence Server to create or access user group information to realize more advanced services wherein the group management server and presence server are standard components of IMS network and are used by PTT infrastructure. Group management server maintains list of groups created by user. These group definitions can be created, modified and deleted by user. This can also be accessed by other entities in the networks if permitted. Presence server maintains presence information about users, this information can be created, modified and deleted by users. Other users and entities in the networks if permitted can also access this information. However these additional components can be realized within PTT server implementation.

Figure 5:
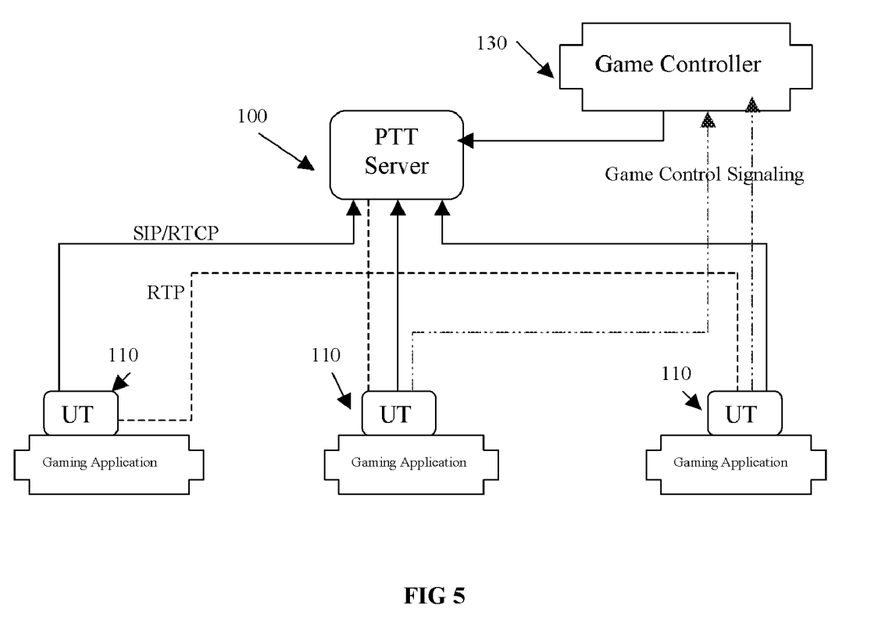
FIG. 5 illustrates the game control signaling interfaces.

Referring to FIG. 5, PTT/PTV infrastructure can be based on Session Initiation Protocol i.e. SIP (e.g. PoC as defined by Open Mobile Alliance (OMA)) or can use any proprietary technology. PTT/PTV infrastructure need not be restricted to wireless or mobile networks and can be extended by fixed and/or converged fixed-mobile networks (FMC—Fixed Mobile Convergence).

Figure 6:
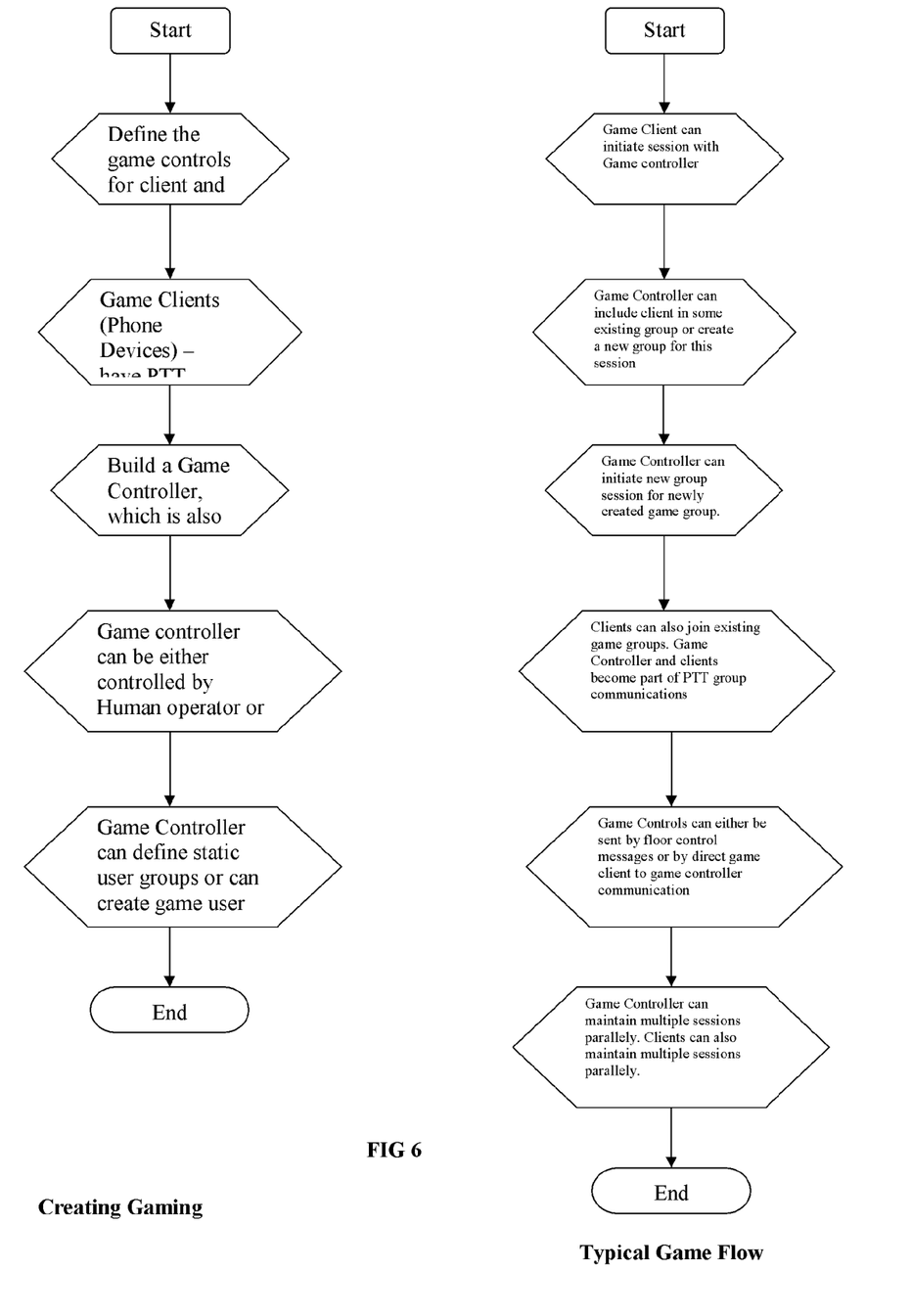
FIG. 6 is the flow chart illustrating the sequential steps from the initiation to termination of the game in accordance with the present invention.

FIG. 6 is the flow chart illustrating the sequential steps form the initiation to termination of the game. In accordance with the present invention these controls are based on PTT protocols and as standardized by consortiums. These are published interfaces and are based on SIP and RTP protocols as developed by IETF. However, the game controller and game client can also use other means to control flow of the game. These other means include a proprietary protocol between game controller and game client as defined by game author. These other means can also be based on some of the standard protocols including SIP, HTTP or TCP as implemented on both game controller and game client.

Figure 7:
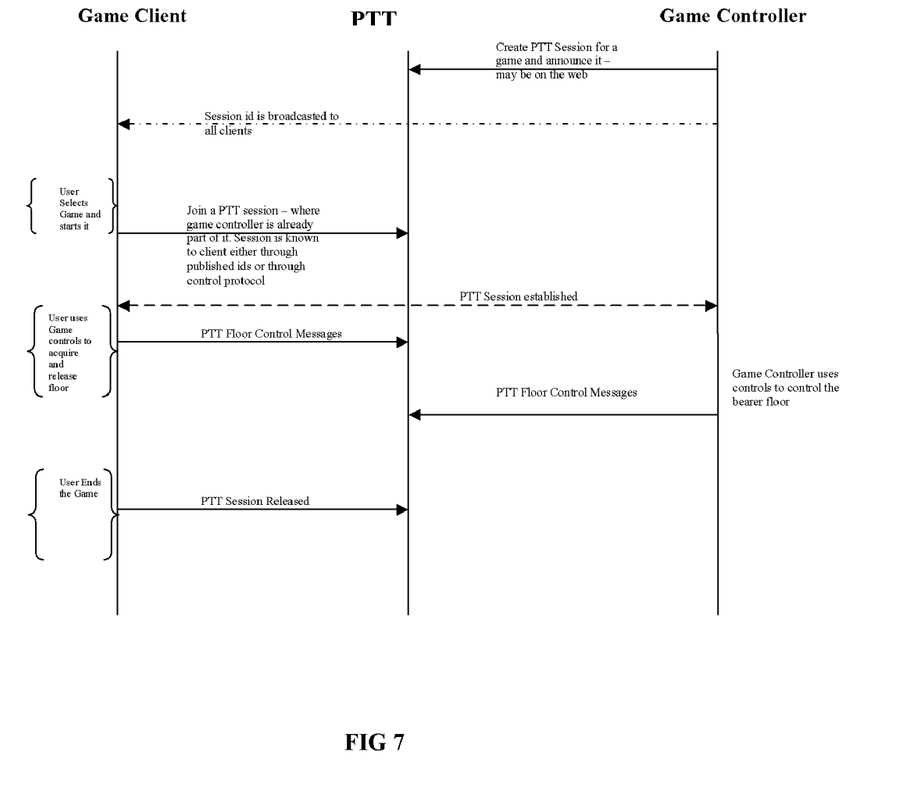
FIG. 7 is the message flow diagram for PTT gaming service indicating the sequence from establishing the gaming session to termination of the gaming session in accordance with the present invention.

FIG. 7 is the message flow diagram for PTT gaming service indicating the sequence from establishing the gaming session to termination of the gaming session in accordance with the present invention. The game clients (100) uses SIP messages to request for service. The game controller (130) uses SIP to respond to the game clients (110). The game controller (130) uses XCAP to upload group information onto PTT server (100) and the Game Ids are announced on the web and game clients need these Ids to request for the service.

The said game controller (130) can host multiple games. These games can be multiple instances of same game or can be independent games. Game controller (130) does not have any limit on number or players in each game or each session. These limits however can be imposed by the game. Each client (110) or player registers with the game controller (130) to register the intent to play the game and current location of player or device are known to PTT infrastructure. Players can also join the current games being held by game controller (130). Gaming application or game controller (130) is the first client, which joins the PTT/PTV communication. It creates the PTT/PTV groups for games. Game controller can also publish the gaming schedule and group names for each such schedule. It can also allow players to join games during any game session. Game controller controls the access to the media floor. Game controller can hold the media floor for any duration of time, and each player is given floor for limited period of time. Game controller can announce/show the game steps, game hints or game questions to all the players and then release the floor for players to play the game and if required grab the floor. Each player can take the floor to answer the questions or announce the win or any result of the game. Game controller will then validate this step of the player and announce the winner. Game controller can optionally remove the players from the game, if answer is wrong or announcement is not correct. Game controller can optionally move players to next level or announce the price or award for correct steps or right answers. Game controller can revoke the floor from any user. It can also remove players from the game if required. Game controller can optionally insert advertising material in between the floor taken and floor release sequences.

The following non-limiting examples further illustrate the present invention. They are, however, not intended to be limiting the scope of present invention in any way.

EXAMPLE 1

"Quizzing on PTT/PTV"—Players register with Quiz Master (GC) for quiz. Quiz Master asks question/show clips and then releases the floor. The game controller inserts music or voice announcements in between as advertising material. Floor is available to players for short time, whosoever takes the floor is requested to answer the question. For correct answer, a player is moved to next level and for wrong answer, a player is removed from the game.

EXAMPLE 2

"Tambola on PTT"—This game requires each player to request a Tambola ticket from game controller, game controller returns an e-ticket. Then all the players join the game as PTT session. Game controller (130) starts announcing numbers and after each announcement releases the floor. If any player has met the game criteria (like first row finished or last row finished), takes the floor and announce it. Game controller verifies the claim and either awards the player with some prize or throws the player out of game. Game controller also inserts music or voice announcements in between as advertising material.

The following is the description of the software operable to implement "Tambola" (also called "Housie" and "Bingo" in some other countries) on PTT infrastructure. This is one of the examples of how group games can be created on PTT infrastructure.

Figure 8:
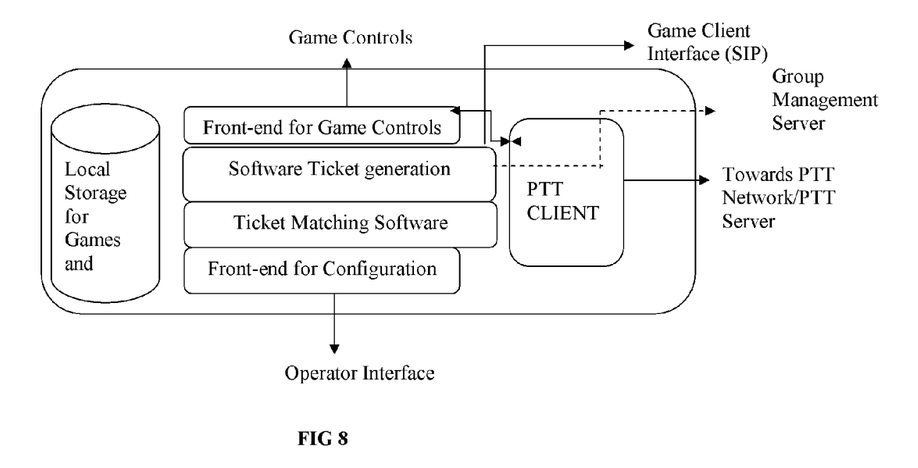
FIG. 8 is the software architecture of the game controller for implementing Tambola.

Referring to FIG. 8, the game controller software and game client software has been implemented to realize tambola game. Game controller software is implemented on Windows based PC and game client is implemented on HP iPAQ PDA running windows mobile. PTT infrastructure is supported on Wireless LAN and is a standard PTT implementation compliant to OMA PoC specifications.

Following description provides high level view of the game in general followed by game flow on PTT, which is followed by implementation details.

Game Details

Tambola has large number of tickets typically has a table of 3×3 and all the cells in this table filled with numbers 1 to 99. Each participant is given a ticket. Game controller (130) randomly selects a number from pool of numbers (1 to 99) and

| Typical Ticket | | |
|---|---|---|
| 22 | 3 | 21 |
| 34 | 12 | 87 |
| 2 | 76 | 1 | announces it. Each participant who has that number on his ticket will strike that number from ticket. Each game provides prizes for any full row (all numbers in that row) struck out or all corners etc, and finally all numbers on the ticket. Different criteria have different prizes. It is a group game and requires a controller to play it. It requires announcement from controller, which should go to all users and also from participants when one of the criteria is met.

Game Flow as Implemented on PTT

Game Client iPAQ PDA has a game software, which when started, provides a view to the user to request for a particular game. If user requests ticket, request is sent to game controller (130) and ticket is returned to the user electronically. At the scheduled time, user is invited to a PTT session, where game controller (130) announces numbers and after each announcement releases the floor for users to announce their win. A user takes PTT floor and announces their win. If announcement is correct—Game controller (130) records user win.

Game Controller

Game controller (130) provides an environment to create and schedule games. Once created, participants request tickets for the game. Game controller (130) generates tickets (with random numbers) and sends them back to participants. Game controller (130) records tickets generated and participant's identity for later matching of win announcement by participant with local matching logic. Game controller (130) also uploads the participant details to PTT server (100) to create group information for PTT group. Once the schedule time arrives, game controller (130) starts the game by inviting the group into the game. Game controller (130) sends invitation to PTT server (100) for the whole group and PTT server (100) invites all participants into the game. Now game controller (130) generates random number sequence and announces those numbers—after each announcement it releases floor control for participants to announce their win. If a participant takes floor and announces win—game controller logic (150) matches number announced against participants ticket stored locally. If match found, prize is granted and game continues. Once the game ends, game controller (130) releases PTT session and deletes group information from PTT server (100).

Software Architecture for Game Controller

Game controller (130) is implemented on Windows PC, which has a PTT client embedded into it. It has a front-end to create games and schedule them. It has a software interface to accept ticket requests from clients and generate tickets for users. These tickets and game information is stored on local disk. Controller software has front end to play the game It has software to generate random numbers. Game controller (130) front-end has button to take and release the floor. It also has logic to match numbers announced with winning ticket.

While the present invention has been described as a method for creating a gaming infrastructure using PTT/PTV, it should be apparent to those skilled in the art that the foregoing is merely illustrative and not limiting. Numerous modifications and other embodiments can be made without departing from the spirit and scope of the invention.

Further, the present invention would involve the configuration of different components involving PTT/PTV infrastructure, PTT/PTV clients, gaming controller or gaming application thereby providing a system and method for creating the gaming infrastructure using PTT/PTV technology.

List of Abbreviations

The following are the abbreviations used in this specification. Though most of these abbreviations are commonly used in the communications industry, the acronyms and their expansions are provided herein for ready reference.

(i) OMA: Open Mobile Alliance
(ii) IETF: Internet Engineering Task Force.
(iii) PTT: Push-to-Talk
(iv) PTV: Push-to-Video
(v) PoC—PTT over Cellular Networks
(vi) SIP: Session Initiation Protocol
(vii) RTP: Real Time Transport Protocol (viii) XCAP: XML (Extendible Mark Up language) Configuration Access Protocol
(ix) RTCP: Real Time Transport Control Protocol
(x) UT: User Terminal
(xi) FMC: Fixed and Mobile Converged Network

I claim:

1. A system for implementing games in a communication network using push-to-talk/push-to-video technology, the system comprising:
   a push-to-talk/push-to-video server in communication with a plurality of push-to-talk/push-to-video clients over an access network; and
   a game controller in communication with said push-to-talk server/push-to-video server and any or all of said plurality of push-to-talk/push-to-video clients, the game controller having:
      a first game control means configurable to interface with any or all of said push-to-talk/push-to-video clients to manage a game in session employing a game logic;
      a game authentication means, capable of authenticating game participation request from any of said plurality of push-to-talk/push-to-video clients;
      a game billing means capable of generating billing records of any of said push-to-talk/push-to-video clients participating in a game;
      a second game control means enabling an end user by generating game configuration, game controls, game schedules and game groups; and
      a local storage means for storing game and participation information; wherein said game controller is capable of controlling the flow of a game by controlling bearer floor, and wherein said system is configured to implement games involving any or all of said plurality of push-to-talk/push-to-video clients in communication with said push-to-talk/push-to video server over said access network.

2. The system according to claim 1, wherein said game controller hosts any one of said plurality of push-to-talk/push-to-video clients.

3. The system according to claim 1, wherein said game controller is implemented as standalone entity or embedded in PTT Server.

4. The system according to claim 1, wherein said game controller is configured to control access to media floor.

5. The system according to claim 1, wherein any one of said plurality of push-to-talk/push-to-video clients is capable of participating in a scheduled gaming session or an ongoing gaming session.

6. The system according to claim 1, wherein said first game control means is configurable to permit registration by any or all of said plurality of push-to-talk/push-to-video clients for a group game.

7. The system according to claim 6, wherein said first game control means is configured to receive user information from any or all of said plurality of push-to-talk/push-to-video clients initiating to participate in a game and transfers said user information to said local storage means for temporary storing.

8. The system according to claim 1, wherein said game controller is capable of hosting multiple group games concurrently.

9. The system according to claim 1, wherein said game controller alternates between any one of said plurality of push-to-talk/push-to-video clients participating in a group game.

10. The system according to claim 1, wherein the system is configured to display game related information to said plurality of push-to-talk/push-to-video clients participating in a group game.

11. The system according to claim 10, wherein said game related information comprises game contents, next steps, clips and videos.

12. The system according to claim 1, capable of being implemented in a wireless or a wireline communication system.

13. The system according to claim 1, wherein said game controller is capable of holding the media floor for any duration of time.

14. The system according to claim 1, wherein said game controller is configured to optionally insert advertising material in between the floor occupying and floor releasing sequences.

15. The system according to claim 1, wherein said game controller is capable of using floor control to announce game results.

16. The system according to claim 1, wherein said game controller is capable of removing players from the game.

17. The system according to claim 1, further comprising a group management server configured to receive and store user information received from said local storage means.

18. The system according to claim 17, wherein said group management server enables access to said user information by said game controller.

19. The system according to claim 1, further comprising a presence server, configured to maintain presence information of any or all of said plurality of push-to-talk/push-to-video clients participating in a game.

20. The system according to claim 19, wherein said presence server enables access to said presence information by said game controller and/or any or all of said plurality of push-to-talk/push-to-video clients participating in a game.

21. The system according to claim 1, wherein the system is configurable to implement any of a plurality of group games, including tambola, quizzing, controlled group voting, or group auction.

22. A method of implementing games in a communication network using push-to-talk/push-to-video technology, the method comprising:
   configuring a push-to-talk/push-to-video server in communication with a plurality of push-to-talk/push-to-video clients over an access network;
   configuring a game controller having a first game control means, a game authentication means, a billing means, a second game control means, and a local storage means, said game controller in communication with said push-to-talk server/push-to-video and any or all of said plurality of push-to-talk/push-to-video clients;
   managing a game session employing a game logic by said first game control means, said first game control means interfacing with any or all of said push-to-talk/push-to-video clients;
   authenticating game participation of any of said plurality of push-to-talk/push-to-video clients by said game authentication means;
   generating billing records of any of said push-to-talk/push-to-video clients participating in a game by said billing means;
   enabling an end user to generate game controls by said second game control means;
   storing game and participation information by said local storage means; and implementing a game involving any or all of said plurality of push-to-talk/push-to-video clients in communication with said push-to-talk/push-to-video server over said access network wherein the flow of a game is controlled by said game controller by exercising control over bearer floor or employing other means defined between game controller and game client software.

23. The method according to claim 22, comprising controlling access to media floor by said game controller.

24. The method according to claim 22, comprising concurrently hosting multiple games by said game controller.

25. The method according to claim 22, comprising displaying game related information to said plurality of push-to-talk/push-to-video clients participating in a group game by said game controller.

26. The method according to claim 22, implemented in a wireless or a wireline communication system.

27. The method according to claim 22, comprising holding the media floor for any duration of time by said game controller.

28. The method according to claim 22, comprising revoking media floor from any or all of said push-to-talk/push-to-video clients by said game controller.

29. The method according to claim 22, comprising optionally inserting advertising material in between the floor occupying and floor releasing sequences by said game controller.

30. The method according to claim 22, comprising announcing game results by said game controller of using said floor control.

31. The method according to claim 22, comprising receiving user information from any or all of said plurality of push-to-talk/push-to-video clients and transferring said user information to said local storage means for temporary storing by said first game control means.

32. The method according to claim 22, further comprising receiving and storing user information from said local storage means by a group management server.

33. The method according to claim 22, further comprising maintaining presence information of any or all of said plurality of push-to-talk/push-to-video clients participating in a game by a presence server.

34. The method according to claim 22, wherein implementing a game comprises implementing any of a plurality of group games, including tambola, quizzing, controlled group voting, or group auction.

* * * * *

UNITED STATES PATENT AND TRADEMARK OFFICE
CERTIFICATE OF CORRECTION

PATENT NO. : 7,593,744 B2
APPLICATION NO. : 11/427168
DATED : September 22, 2009
INVENTOR(S) : Sunil Majahan It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 756 days.

Signed and Sealed this

Twenty-eighth Day of September, 2010

David J. Kappos
*Director of the United States Patent and Trademark Office*

UNITED STATES PATENT AND TRADEMARK OFFICE
CERTIFICATE OF CORRECTION

PATENT NO.       : 7,593,744 B2  
APPLICATION NO.  : 11/427168  
DATED            : September 22, 2009  
INVENTOR(S)      : Sunil Mahajan It is certified that error appears in the above-identified patent and that said Letters Patent is hereby corrected as shown below:

Title page, item [75] inventors name "Sunil Majahan" should be changed to --Sunil Mahajan--.

Signed and Sealed this
Fifth Day of May, 2015

Michelle K. Lee
*Director of the United States Patent and Trademark Office*